United States Patent [19]

Hornung et al.

[11] Patent Number: 4,750,172
[45] Date of Patent: Jun. 7, 1988

[54] METHOD FOR COMBINING A DIGITAL VIDEO SIGNAL AND THREE DIGITAL NARROW BAND SIGNALS TO FORM A 139,264 KBIT/S SIGNAL

[75] Inventors: Franz Hornung; Johann Muhr, both of Munich; Friedrich Schalamon, Germering, all of Fed. Rep. of Germany

[73] Assignee: Siemens Aktiengesellschaft, Berlin and Munich, Fed. Rep. of Germany

[21] Appl. No.: 891,390

[22] Filed: Jul. 31, 1986

[30] Foreign Application Priority Data

Jul. 31, 1985 [DE] Fed. Rep. of Germany ....... 3527452

[51] Int. Cl.⁴ .............................................. H04J 3/07
[52] U.S. Cl. ..................... 370/102; 370/112
[58] Field of Search ........................ 370/100, 102, 112

[56] References Cited

U.S. PATENT DOCUMENTS

| | | | |
|---|---|---|---|
| 3,868,481 | 2/1975 | Patrusky et al. | 370/102 |
| 3,987,248 | 10/1976 | Platet et al. | 370/102 |
| 4,504,943 | 3/1985 | Nagano | 370/112 |
| 4,535,451 | 8/1985 | Drupsteen | 370/102 |
| 4,542,498 | 9/1985 | Bodros et al. | 370/102 |
| 4,596,026 | 7/1986 | Cease et al. | 370/102 |
| 4,667,324 | 5/1987 | Graves | 370/102 |
| 4,669,080 | 5/1987 | Aveneau et al. | 370/102 |
| 4,674,088 | 7/1987 | Grover | 370/102 |

FOREIGN PATENT DOCUMENTS

| | | | |
|---|---|---|---|
| 0054120 | 6/1982 | European Pat. Off. | 370/112 |
| 3213534 | 10/1983 | Fed. Rep. of Germany | |
| 3227780 | 1/1984 | Fed. Rep. of Germany | |
| 3230943 | 2/1984 | Fed. Rep. of Germany | |
| 3229399 | 2/1984 | Fed. Rep. of Germany | |
| 3230271 | 2/1984 | Fed. Rep. of Germany | |
| 3249340 | 8/1984 | Fed. Rep. of Germany | |
| 3346501 | 7/1985 | Fed. Rep. of Germany | 370/102 |
| 3445355 | 6/1986 | Fed. Rep. of Germany | |

OTHER PUBLICATIONS

Kühne et al, "Digital signal ... bis 565 Mbit/s", Telcom Report, 1980, vol. 3, No. 4, pp. 344–352.
CCITT Yellow Book, "Transmission Systems and Multiplexing Equipment", 1981, vol. III, Fascicle 111.3, p. 147.

Primary Examiner—Salvatore Cangialosi
Attorney, Agent, or Firm—Hill, Van Santen, Steadman & Simpson

[57] ABSTRACT

A first plesiochronic digital signal having a bit rate of 135,000 kbit/s, a second plesiochronic digital signal having a bit rate of 1024 kbit/s, a third plesiochronic digital signal having a bit rate of 2048 kbit/s and a fourth plesiochronic digital signal having a bit rate of 64 kbit/s are multiplexed to form a fifth digital signal having a bit rate of 139,264 kbit/s in a basic frame having a length of 2928 bits and beginning with a 12-bit frame recognition word and having a four-bit message word. The signals are demultiplexed such that the first through fourth digital signals are demultiplexed from the fifth digital signal, in particular using a stuffing process.

12 Claims, 4 Drawing Sheets

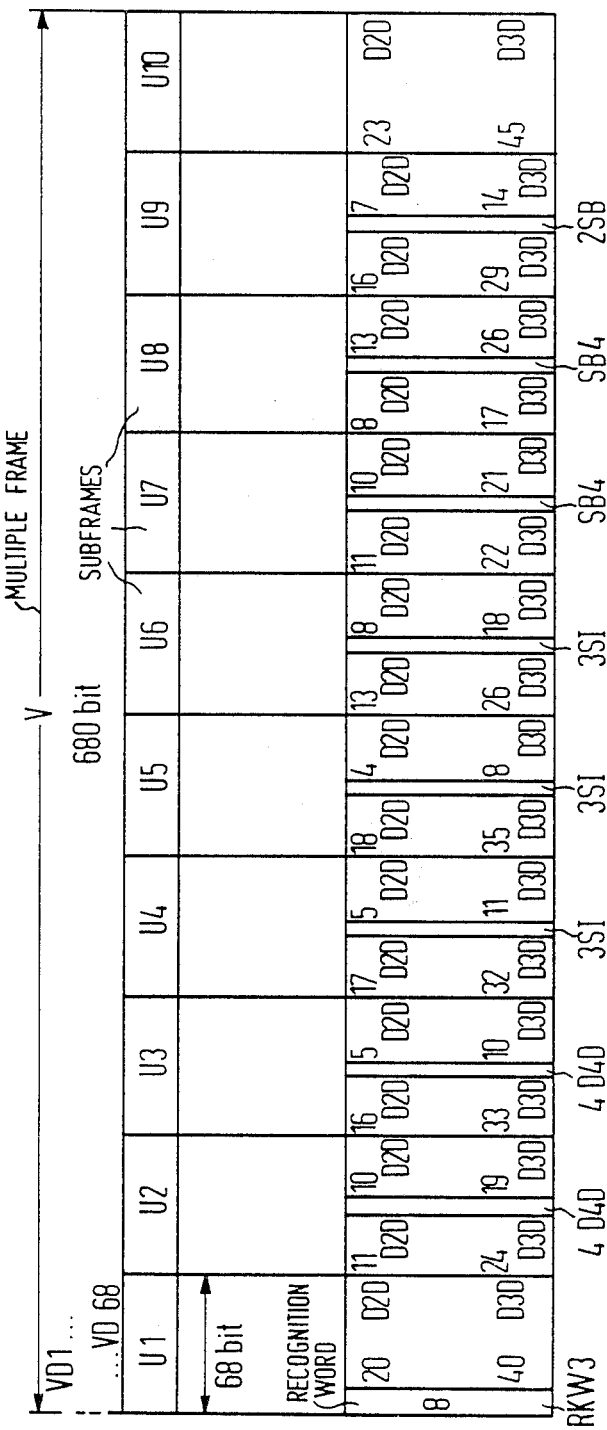

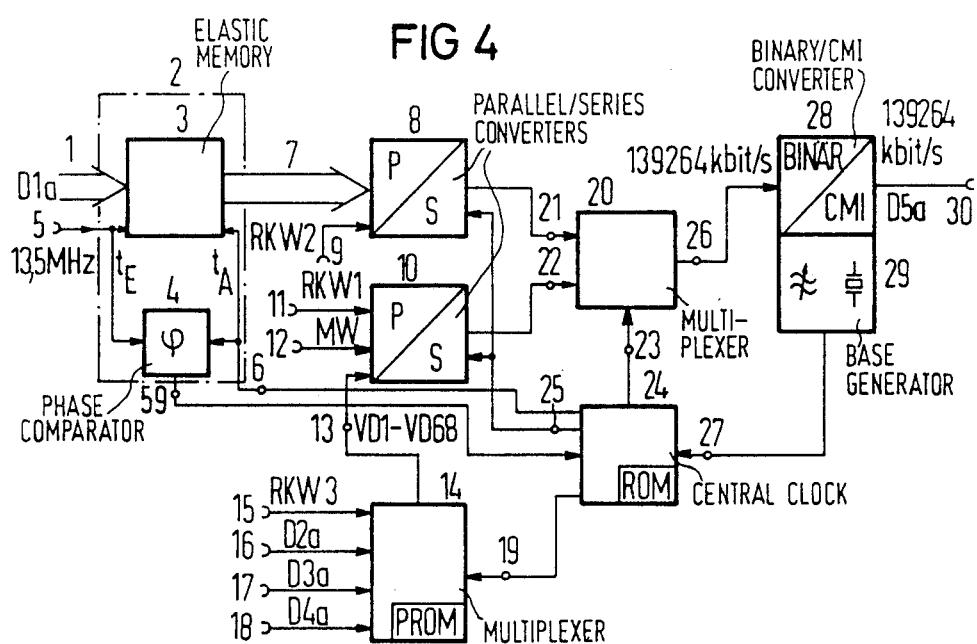
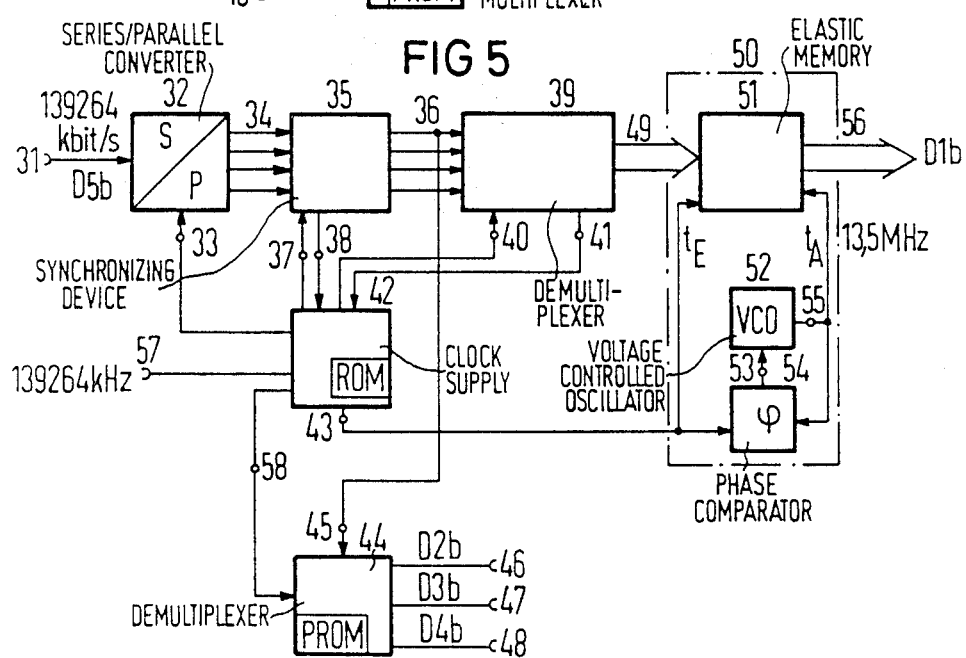

METHOD FOR COMBINING A DIGITAL VIDEO SIGNAL AND THREE DIGITAL NARROW BAND SIGNALS TO FORM A 139,264 KBIT/S SIGNAL

BACKGROUND OF THE INVENTION

1. Field of the Invention

The present invention relates to a method for combining a digital video signal and three digital narrow band signals to form a 139,264 kbit/s signal and vice-versa and it also relates to a multiplex apparatus and to a demultiplex apparatus in which a first plesiochronic digital signal having a bit rate of 135,000 kbit/s, a second plesiochronic digital signal having a bit rate of 1024 kbit/s, a third plesiochronic digital signal having a bit rate of 2048 kbit/s and a fourth plesiochronic signal having a bit rate of 64 kbit/s are combined to form a fifth digital signal having a bit rate of 139,264 kbit/s in a basic frame comprising a length of 2928 bits beginning with a 12-bit frame recognition word and a 4-bit message word, and demultiplexing first through fourth digital signals from the fifth signal, in particular utilizing a stuffing process.

2. Description of the Prior Art

The German published application No. 32 30 943 A1, fully incorporated herein, discloses a system for digital transmission of video or picture telephone signals which operate with a bit rate of 139,264 kbit/s, wherein the analog video signal is coded onto a bit rate of 135,000 kbit/s and is transmitted by way of synchronous multiplexers and synchronous demultiplexers together with narrow band signals on the basis of a 64 kbit/s raster. A synchronous network must be installed for this purpose.

An earlier proposal, namely German application No. P 34 45 355.5, relates to a combination of corresponding, plesiochronic signals to form a 139,264 kbit/s digital signal. In this method, a 1024 kbit/s signal and a 2048 kbit/s signal are combined in the first multiplexer and the intermediate multiplexed signal formed in this manner is combined with a 135015.625 kbit/s signal in a second multiplexer and is multiplexed with a signal having a bit rate smaller than 237 kbit/s. The pulse frame for the intermediate multiplex signal comprises a length of 3320 bits; the pulse frame for the 139,264 kbit/s signal is subdivided into four sections.

The positive stuffing method serving the purpose of combining plesiochronic digital signals is disclosed in the periodical "telcom report", Vol. 3, No. 4, 1980, pp. 344–352. The bit rate of 139,264 kbit/s and an appertaining pulse frame derive from the CCITT recommendation G. 751 from the "CCITT Yellow Book", Vol III, Fascicle III.3, "Digital Networks-Transmission Systems and Multiplexing Equipment", Geneva, 1981, p. 147.

SUMMARY OF THE INVENTION

The object of the present invention is to likewise provide a method for combining a plesiochronic digital video signal with plesiochronic narrow band signals which can be more simply executed and in which reaction to an outage of the frame recognition word can be carried out more quickly.

The above object is achieved, according to the present invention, in that a video frame having a length of 8646 bits is formed at the transmitting side, this frame accepting a 6-bit frame recognition word and 8640 bits of video data. The invention is further characterized in that a multiple frame having a length of 680 bits is formed for the second through fourth digital signals, subdivided into ten subframes each having a length of 68 bits. Furthermore, the first subframe accepts an eight-bit frame recognition word and data of the second and third digital signals. The further subframes, distributed over the multiple frame, accept three times three stuffing information bits of the second through fourth digital signals, to stuffable bits of the second and third digital signals and a eight-bit stuffing word of the fourth digital signal, as well as further data of the second and third digital signals and data of the fourth digital signal. The basic frame is subdivided into 72 sections of 40 bits each and into one further section having 48 bits. The first section accepts the 12-bit frame recognition word, the four-bit message word and 24 bits of video data. At the first place, the following 72 sections accept one bit of the multiple frame data of the multiple frame or, respectively, one bit of the stuffing information or one stuffable bit of the video signal and 39 bits of video data. The last section additionally accepts 8 bits of video data, and the first four digital signals are reacquired at the receiving side in corresponding steps.

The selected section structure has the advantage that the insertion of the additional bits in the video data stream at the multiplexer can occur in a simple manner by way of shift registers. At the demultiplexer, an advantageous speed transformation can first be executed to one-fourth and, subsequently thereto, to one-tenth of the basic frame frequency.

An advantageous feature of the multiple frame is characterized in that 20 bits of data of the second digital signal and 40 bits of data of the third digital signal are accepted in the first subframe in addition to the eight-bit frame recognition word. Also, 11 bits of data of the second digital signal and 24 bits of data of the third digital signal, 4 bits of data of the fourth digital signal and another 10 bits of data of the second digital signal and 19 bits of data of the third digital signal are accepted in the second subframe. Furthermore, 16 bits of data of the second digital signal and 33 bits of data of the third digital signal, 4 bits of data of the fourth digital signal and 5 bits of data of the second digital signal and 10 bits of data of the third digital signal are accepted in the third subframe. In addition, 17 bits of data of the second digital signal and 32 bits of data of the third digital signal, 3 bits of stuffing information of the second through fourth digital signals and another 5 bits of data of the second digital signal and 11 bits of data of the third digital signal are accepted in the fourth subframe. Also, 18 bits of data of the second digital signals and 35 bits of data of the third digital signal, 3 bits of stuffing information of the second through fourth digital signals and 4 bits of data of the second digital signal and another 8 bits of data of the third digital signal are accepted in the fifth subframe. As to the sixth subframe, 13 bits of data of the second digital signal and 26 bits of data of the third digital signal, three bits of stuffing information of the second through fourth digital signals and another 8 bits of data of the second digital signal and 18 bits of data of the third digital signal are accepted therein. Eleven bits of data of the second digital signal and 22 bits of data of the third digital signal, 4 bits of the first half of an eight-bit stuffing word and of the fourth digital signal, as well as another 10 bits of data of the second digital signal and another 21 bits of data of the third digital signal are accepted in the seventh subframe. In the eighth subframe, 8 bits of data of the second digital signal and 17 bits of data of the third digital signal, the second half of the eight-bit stuffing word of the fourth digital signal, as well as another 13 bits of data of the second digital signal and another 26 bits of data of the third digital signal are accepted in the eighth subframe. Sixteen bits of data of the second digital signal and 29 bits of data of the third digital signal, two stuffable bits of the second and third digital signals, as well as another 7 bits of data of the second digital signal and 14 bits of data of the third digital signal are accepted in the nineth subframe. In the tenth subframe, 23 bits of data of the second digital signal and 45 bits of data of the third digital signal are accepted. In this manner, given the selected multiple frame structure, only a slight memory capacity is required.

It is also advantageous when the stuffing information for the video signal is transmitted in the seventeenth, in the thirty third and in the fourty ninth section and when the sixth fifth section is provided for the transmission of the stuffable bits of the video signal. The counters required in the central clocks can therefore be realized in a simple and cost-effective manner. For the same reason, the number of a total of 48 bits in the seventy third section in comparison to the 40 bits of the preceding section is favorable for filling out the basic frame because 40:48 behaves like 10:12 and standard counters can be employed.

Great protection against mis-synchronization derives when every six-bit frame recognition word is transmitted inverted.

A multiplexer and a demultiplexer are advantageous in practicing the invention in which the multiple frame clocks can be controlled in a simple manner with programmable read-only memories PROM in the first multiplexer and/or in the second demultiplexer. As far as a multiplexer is concerned, the same may be characterized in that a first clock adapter is provided following a video signal input, in that the first clock adapter is followed by a first parallel-to-series converter by way of which the six-bit frame recognition word is fed in, and in that a second parallel-to-series converter is provided by way of which the 12-bit frame recognition word, the 4-bit message word and data from the multiple frame are fed in. In addition, a first multiplexer is provided for the information of a multiple frame, the 8-bit frame recognition word, the second digital signal, the third digital signal and fourth digital signal being applied to the first multiplexer and the first multiplexer emitting the multiple frame data to the second parallel-to-series converter. A second multiplexer is provided, the two inputs thereof being respectively connected to the output of the parallel-to-series converters and the second multiplexer emitting the fifth digital signal. A central clock, controlled by a 140 Mbit/s basic generator is provided for controlling the parallel-to-series converters and the multiplexers and receiving filler bit information from the first clock adapter. As to demultiplexing at the receiving side, the structure is characterized in that a series circuit is provided into which the fifth digital signal is fed and from which the video signal is taken, the series circuit being formed of a series-to-parallel converter which divides the fifth signal into four-bit code words, a synchronizing device which sorts the four-bit code words and emits a synchronizing signal to a second central clock given a recognized 12-bit frame recognition word, and which gates out the four-bit message word. Also provided is a first demultiplexer which emits a 10-bit code words at its output, and a second clock adapter is provided. A second demultiplexer has an input supplied with multiple frame data and outputs emitting the second and third and fourth digital signals. The second central clock controls the series-to-parallel converter, the synchronizing device, the multiplexers and the second clock adapter.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a graphic illustration of a selected multiple frame;

FIG. 4 is a schematic representation of a multiplexer;

FIG. 5 is a schematic illustration of a demultiplexer; and

DESCRIPTION OF THE PREFERRED EMBODIMENTS

Figure 1:
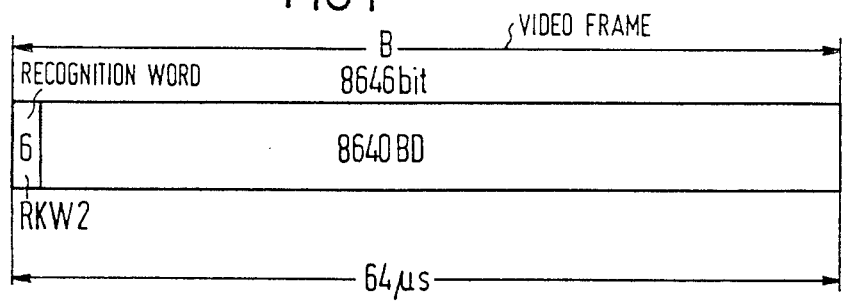
FIG. 1 is a graphic illustration of a selected video frame.

FIG. 1 illustrates a video frame B having a length of 8646 bits which begins with a 6-bit frame recognition word RKW2 followed by 8640 bits of video data VD.

FIG. 2 shows a multiple frame V having a length of 680 bits comprising ten subframes U1–U10 each having a length of 68 bits. These subframes contain multiple frame data VD1–VD68. Data of the second digital signal D2a are referenced D2D, data of the third digital signal D3a are referenced D3D, data of the fourth digital signal D4a are referenced D4D, the stuffing information for these digital signals are referenced SI, and eight-bit stuffing word for the fourth digital signal D4a is referenced twice SB4 and stuffable bits for the second and third digital signals (D2a, D3a) are referenced SB.

The subframe U1 contains an eight-bit frame recognition word RKW3, 20 bit data D2D and 40 bit data 3D3. The subframe U2 contains 11+10 bit data D2D and 24+19 bit data D3D as well as four bit data D4D. The subframe U3 contain 16+5 bit data D2D and 33+10 bit data D3D, as well as four bit data D4D. The subframe U4 contains 17+5 bit data D2D and 32+11 bit data D3D, as well as three bits of stuffing information SI. The subframe U5 contains 18+4 bits of data D2D and 35+8 bits of data D3D, as well as three bits of stuffing information SI. The subframe U6 contains 13+8 bits of data D2D and 26+18 bits of data D3D, as well as three bits of stuffing information SI. The subframe U7 contains 11+10 bits of data D2D and 22+21 bits of data D3D, as well as the first half of the stuffable 8-bit code word SD4. The subframe U8 contains 8+13 bits of data D2D and 17+26 bits of data D3D, as well as the second half of the stuffable 8-bit code word SB4. The subframe U9 contains 16+7 bits of data D2D and 29+14 bits of data D3D, as well as two stuffable bits SB. The subframe U10, finally, contains 23 bits of data D2D and 45 bits of data D3D.

Figure 3:
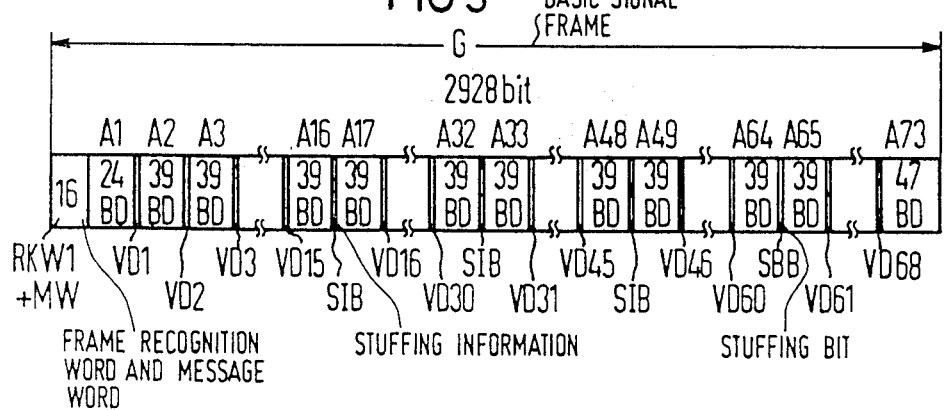
FIG. 3 is a graphic illustration of the basic frame for the 139,264 kbit/s signals.

FIG. 3 illustrates a basic frame G comprising 2928 bits for the 139,264 kbit/s signal. It contains sections A1–A73 of which the sections A1–A72 each contain 40 bits and the section A73 comprises 48 bits. The section A1 contains a 12-bit frame recognition word RKW1 at the beginning and a 4-bit message word MW, and subsequently, 24 bits of video data BD. The multiple frame data VD1–VD68, three times the stuffing information of the video signal SIB and one-time a stuffable bit SBB of the video signal D1a are respectively inserted in the first time slot in the sections A2–A73. A further 39 bits of video data BD are inserted into the sections A2–A72 and 47 bits of video data BD are inserted into this section A73.

FIG. 4 illustrates a multiplexer for use in practicing the present invention. The multiplexer comprises an input 1 in the form of a 10-bit bus for the video signal D1a, a clock adapter 2 comprising an elastic memory 3 and a phase comparator 4, a 10-bit bus 7, a pair of parallel-to-series converters 8 and 10, a pair of multiplexers 14 and 20, a central clock 24, a binary/CMI converter 28, a base generator 29 and an output 30.

A video signal D1a is received via the input 1, being written in with the write-in clock $t_E$ having a frequency 13.5 MHz at an input 5. It is read from the elastic memory 3 at the terminal 6 with a read clock $t_A$ which is supplied by the central clock 24 which, in turn, receives a filling bit information from the phase comparator 4 via the terminal 59. The clock-adapted video signal D1a, together with a 6-bit frame recognition word RKW2 at the terminal 9, is converted with the video frame B of FIG. 1 and is input into the multiplexer 20 by way of the terminal 21 of the parallel-to-series converter 8. An 8-bit frame recognition word RKW3 for the multiple frame, as well as the second through fourth digital signal D2a through D4a are input into the multiplexer 14 via the terminals 15–18, the multiplexer 14 feeding the multiple frame data VD1–VD68 into the parallel-to-series converter 10 via the terminal 13. A 12-bit frame recognition word RKW1 and a four-bit message word MW of the basic frame G are also input into the parallel-to-series converter 10 via the terminals 11 and 12. The sum signal proceeds via the terminal 22 to the multiplexer 20 which emits the 139,264 kbit/s signal having the basic frame G of FIG. 3 at its output 26. The binary/CMI converter 28 converts the signal into the CMI line code which is transmitted onto the line via the output 30.

A 139,264 kHz clock is generated in the base generator 29, this clock being input into the central clock 24 via the terminal 27, the clock 24, in turn, controlling the multiplexer 14 via the terminal 19, the clock adapter 2 via the terminal 6, the parallel-to-series converters 8 and 10 via the terminal 25, and the multiplexer 20 via the terminal 23. The known apparatus for stuffing have been omitted for the sake of clarity.

The video signal D1a at the input 1 was acquired in a 9-bit analog/digital converter after a low-pass filtration and was converted into 10-bit code words in an error protection circuit.

FIG. 5 illustrates a demultiplexer which may be employed in practicing the present invention. The demultiplexer comprises an input 31, a series-to-parallel converter 32, a four-bit bus connection 34, a synchronizing device 35 which interprets the 16-bit frame recognition word RKW1 and the four-bit message word MW, a second four-bit bus connection 36, a demultiplexer 39 for the video signal D1b, a pair of 10-bit buses 49 and 56, a clock adapter 50, a clock supply 42, and a demultiplexer 44. The clock adapter 50 comprises an elastic memory 51, a voltage-controlled oscillator 52 and a phase comparator 54. A CMI/binary converter required at the input side and a device for deriving the 139,264 kHz clock are not shown.

Figure 6:
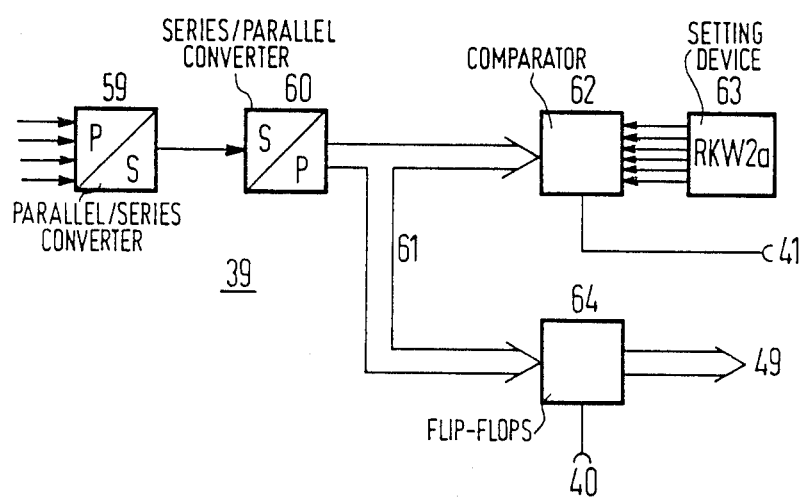
FIG. 6 is a schematic representation of a demultiplexer which may be utilized in practicing the present invention.

A 139,264 kbit/s signal D5b is applied to the input 21 and is converted in the series-to-parallel converter 32 into a parallel 4-bit code word with a bit rate of 34,816 kbit/s. After a recognized 12-bit frame recognition word RKW1, a synchronization signal is output in the synchronizing device 35, a commercially available integrated circuit SH100-B-864, being output to the central clock 42 via the terminal 38. The four-bit message word MW is also gated out. The position of the multiple frame data VD1–VD68 is obtained after a first position of every 10$^{th}$ four-bit code word and are supplied to the demultiplexer 44 having a standard buffer memory, destuffing device and monitoring circuit. The second through fourth digital signals D2b through D4b are available as uniform data streams at the outputs 46–48. The video data stream, as shall be set forth in greater detail with reference to FIG. 6, is converted, in a series-to-parallel manner, in the demultiplexer 39 into 10-bit code words, is destuffed and is read via the elastic memory 51 with a uniform 13.5 MHz clock. The reading clock $t_A$, as usual, is acquired via the phase comparison circuit 54 with the writing clock $t_E$, being acquired from a voltage-controlled oscillator 52 which is synchronized thereto. The clock supply 42 is controlled by the incoming 139,264 kHz clock at the input 57 and generates all necessary clocks at the terminals 33, 37, 40, 43 and 58.

The clock adapters 2 and 50 are known from FIG. 7 of the aforementioned article from the publication "telcom report", and the apparatus described therein.

The apparatus for implementing the stuffing procedure were not incorporated in FIG. 5 since they are well known to those of ordinary skill in the art.

Referring to FIG. 6, a demultiplexer 39 of FIG. 5 is illustrated in detail. The demultiplexer comprises a parallel-to-series converter 59, a 10-bit bus 61, a comparator 62 (an ECL F 100166 circuit), a setting device 63 for the frame recognition word RKW2, and 10 D flip-flops in the form of two series-connected integrated circuits, ECL F 100151). The parallel-to-series converter 59 can be part of the integrated circuit employed for the synchronizing device 35.

The four-bit code words applied to the input of the demultiplexer 39 and, therefore, to the input of the parallel-to-series converter 59 are converted into a 139,264 kbit/s signal in the converter, this signal being, in turn, converted in the series-to-parallel converter 60 into constantly asynchronously traversing 10-bit code words. These code words proceed via the 10-bit bus 61 to the comparator 62 which constantly compares the same to a reference frame recognition word RKW2a which is stored in the setting device 63. When the frame recognition word RKW2 is recognized, a synchronizing signal for the video frame is output at the output 41. The 10-bit codes are also supplied via the 10-bit bus 61 to the ten D flip-flops 64 whose outputs form the output of the demultiplexer 39. The frame recognition word RKW2 is thereby gated out with the assistance of the clock at the clock input 40.

Although we have described our invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of our contribution to the art.

We claim:

1. A method of multiplexing a plesiochronic first digital signal (D1a) of video data having a bit rate of 135,000 kbit/second, a plesiochronic second digital signal (D2a) of stereo audio data having a bit rate of 1024 kbit/second, a plesiochronic third digital signal (D3a) having a bit rate of 2048 kbit/second, and a plesiochronic fourth digital signal (D4a) having a bit rate of 64 kbit/second to form a fifth digital signal (D5a) having a bit rate of 139,264 kbit/second in a basic frame (G) having a length of 2928 bits beginning with a 12-bit frame recognition word (RKW1) and a 4-bit message word (MW), and of demultiplexing the first through fourth digital signals (D1b-D4b) from the fifth digital signal (D5b), comprising the steps of:

generating a video frame (B) at a transmitting side having a length of 8646 bits including a 6-bit frame recognition word (RKW2) and 8640 bits of video data (BD);

generating a multiple frame (V) at the transmitting side having a length of 680 bits for the second through fourth digital signals (D2a-D4a) divided into ten subframes (U1-U10) each having a length of 68 bits, such that the first subframe (U1) includes an 8-bit frame recognition word (RKW3) and data (D2D,D3D) of the second and third digital signals (D2a, D3a), the second through eighth subframes (U2-U8), distributed over the multiple frame (v), include three times three stuffing information bits (SI) of the second through fourth digital signals (D2a-D4a), two stuffing bits (SB) of the second and third digital signals (D2a,D3a), and 8-bit stuffing word (SB4,SB4) of the fourth digital signal, data (D2D,D3D) of the second and third digital signals (D2a,D3a), and data (D4D) of the fourth digital signal;

dividing the basic frame (G) into 72 sections (A1-A72) of 40 bits each and a further section (A73) of 48 bits, wherein the first section (A1) includes the 12-bit frame recognition word (RKW1), the 4-bit message word and 24 bits of video data;

the following sections (A2-A73) include, in the first place, either one bit of the multiple frame data (VD1-VD68) of the multiple frame (V) or one bit of stuffing information (SIB) or one bit (SBB) of the video signal (D1) and 39 bits of video data (BD), the last section (A73) additionally includes 8 bits of video data (BD); and demultiplexing the first four digital signals (D1B-D4b) from the fifth digital signal (D5b) in corresponding steps.

2. The method of claim 1, and further comprising the steps of:

multiplexing 20 bits of data (D2D) of the second digital signal (D2a) and 40 bits of data (D3D) of the third digital signal (D3a) into the first subframe (U1) along with the 8-bit frame recognition word (RKW3);

multiplexing 11 bits of data (D2D) of the second digital signal, 24 bits of data (D3D) of the third digital signal (D3a), 4 bits of data (D4D) of the fourth digital signal (D4a), an additional 10 bits of data (D2D) of the second digital signal (D2a) and an additional 19 bits of data (D3D) of the third digital signal (D3a) into the second subframe (U2);

multiplexing 16 bits of data (D2D) of the second digital signal, 33 bits of data (D3D) of the third digital signal (D3a), 4 bits of data (D4D) of the fourth digital signal (D4a), another 5 bits of data (D2D) of the second digital signal, and another 10 bits of data (D3D) of the third digital signal (D3a) into the third subframe (U3);

multiplexing 17 bits of data (D2D) of the second digital signal (D2a), 32 bits of data (D3D) of the third digital signal (D3a), 3 bits of stuffing information (3SI), 5 bits of data (D2D) of the second digital signal (D2a) and 11 bits of data (D3D) of the third digital signal (D3a) into the fourth subframe (U4);

multiplexing 18 bits of data (D2D) of the second digital signal (D2a), 35 bits of data (D3D) of the third digital signal (D3a), 3 stuffing information bits (3SI) of the second through fourth digital signals (D2a-D4a), 4 bits of data (D2D) of the second digital signal (D2a) and 8 bits of data (D3D) of the third digital signal (D3a) into the fifth subframe (U5);

multiplexing 13 bits of data (D2D) of the second digital signal (D2a), 26 bits of data (D3D) of the third digital signal (D3a), 3 stuffing information bits (3SI) of the second through fourth digital signals (D2a-D4a), 8 bits of data (D2D) of the second digital signal (D2a) and 18 bits of data (D3D) of the third digital signal (D3a) into the sixth subframe (U6);

multiplexing 11 bits of data (D2D) of the second digital signal (D2a), 22 bits of data (D3D) of the third digital signal (D3a), 4 bits (SB4) of the first half of an 8-bit stuffing word of the fourth digital signal (D4a), 10 bits of data (D2D) of the second digital signal (D2a) and 21 bits of data (D3D) of the third digital signal (D3a) into the seventh subframe (U7);

multiplexing 8 bits of data (D2D) of the second digital signal (D2a), 17 bits of data (D3D) of the third digital signal (D3a), 4 bits (SB4) of the second half of the 8-bit stuffing word of the fourth digital signal (D4a), 13 bits of data (D2D) of the second digital signal (D2a) and 26 bits of data (D3D) of the third digital signal (D3a) into the eighth subframe (U8);

multiplexing 16 bits of data (D2D) of the second digital signal (D2a), 29 bits of data (D3D) of the third digital signal (D3a), 2 stuffing information bits (2SB) of the second and third digital signals (D2a and D3a), 7 bits of data (D2D) of the second digital signal (D2a) and 14 bits of data (D3D) of the third digital signal (D3a) into the ninth subframe (U9); and multiplexing 23 bits of data (D2D) of the second digital signal (D2a) and 45 bits of data (D3D) of the third digital signal (D3a) into the tenth subframe (U10).

3. The method of claim 2, and further comprising the steps of:

transmitting stuffing information bits (SIB) of the first data signal (D1a) in the seventeenth, thirty-third and fourty-ninth sections (A17, A33, A49); and transmitting stuffing bits (SBB) of the first digital signal (D1a) in the sixty-fifth section (A65).

4. The method of claim 3, and further comprising the step of:

transmitting every second 6-bit frame recognition word inverted.

5. Multiplexer apparatus comprising:

a first input for receiving a first digital signal of parallel video data;

a clock operable to emit clock pulses;

a clock adapter connected to said first input and to said clock for receiving, intermediately storing and outputting said first digital signal;

a first parallel-to-series converter connected to said clock adapter for converting the first digital signal into a serial signal and including an input for receiving and adding a first frame recognition word, to the serial signal;

a first multiplexer including a plurality of inputs for respectively receiving a second frame recognition word, and first, second and third digital signals to be multiplexed, a clock input connected to said clock, and an output for emitting multiplexed signals in a multiple frame;

a second parallel-to-series converter including a plurality of inputs respectively connected to receive a third frame recognition word, a message word and the multiplexed signals of said first multiplexer, and operable to convert the same into a serial signal; and a second multiplexer connected to said clock and to said first and second parallel-to-series converters for forming a multiplexed fifth digital signal.

6. The multiplexer apparatus of claim 5, wherein: said muliplexers each comprise an erasable read-only memory defining the operation thereof.

7. The multiplexer apparatus of claim 5, wherein: said multiplexers each comprise a nonerasable read-only memory defining the operation thereof.

8. The multiplexer apparatus of claim 5, wherein: said multiplexers each comprise a nonerasable plug-in read-only memory defining the operation thereof.

9. Demultiplexer apparatus comprising:

an input for receiving a serial fifth multiplexed digital signal comprising first, second, third and fourth digital signals, a message word and frame recognition words;

a clock operable to emit clock pulses;

a series-to-parallel converter connected to said input and to said clock for converting and dividing said fifth digital signal into code words;

synchronizing means connected to said series-to-parallel converter operable to sort out the code words and connected to and operable to provide a synchronizing signal to said clock in response to a predetermined frame recognition word and to gate out the message word;

a first demultiplexer connected to said synchronizing device and to said clock for emitting code words of the first digital signal and multiple frame data of the second, third and fourth digital signals;

a clock adapter connected to said clock and to said first demultiplexer for adapting the demultiplexed first digital to a predetermined transmission rate; and a second demultiplexer connected to said clock and to said first demultiplexer for demultiplexing the second, third and fourth digital signals from the multiple frame data.

10. The demultiplexer apparatus of claim 9, wherein: said demultiplexers each comprise an erasable read-only memory defining the operation thereof.

11. The demultiplexer apparatus of claim 9, wherein: said demultiplexers each comprise a nonerasable read-only memory defining the operation thereof.

12. The demultiplexer apparatus of claim 9, wherein: said demultiplexers each comprise a nonerasable plug-in read-only memory defining the operation thereof.

* * * * *